United States Patent
Moon et al.

(10) Patent No.: US 7,599,446 B2
(45) Date of Patent: Oct. 6, 2009

(54) MODULATION AND DEMODULATION BASED ON HIERARCHICAL MODULATION

(75) Inventors: Sung Uk Moon, Yokosuka (JP); Takahiro Hayashi, Yokosuka (JP); Toshiyuki Futakata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 702 days.

(21) Appl. No.: 10/661,602

(22) Filed: Sep. 15, 2003

(65) Prior Publication Data

US 2004/0066844 A1 Apr. 8, 2004

(30) Foreign Application Priority Data

Oct. 3, 2002 (JP) .............................. 2002-291571

(51) Int. Cl.
*H04L 27/00* (2006.01)
*H04L 27/36* (2006.01)
*H04L 27/20* (2006.01)
*H04L 23/00* (2006.01)

(52) U.S. Cl. ....................... 375/295; 375/298; 375/308; 375/377

(58) Field of Classification Search ................. 375/295, 375/300, 308, 309, 298, 259, 268, 269, 271–274, 375/279–281, 222, 261–264, 377; 455/512, 455/166.2, 435.3, 435.2
See application file for complete search history.

(56) References Cited

U.S. PATENT DOCUMENTS

| | | | |
|---|---|---|---|
| 5,914,959 A * | 6/1999 | Marchetto et al. ............ 370/468 |
| 6,118,825 A * | 9/2000 | Ikeda et al. .................. 375/259 |
| 6,301,558 B1 | 10/2001 | Isozaki |
| 6,337,881 B1 | 1/2002 | Chaddha |
| 6,778,816 B1 * | 8/2004 | Ohno ....................... 455/343.1 |
| 6,968,212 B1 * | 11/2005 | Aoyama et al. ........... 455/562.1 |
| 6,993,096 B1 * | 1/2006 | Shiraishi et al. .............. 375/329 |
| 7,043,210 B2 * | 5/2006 | Zhu et al. .................... 455/102 |
| 2001/0012322 A1 * | 8/2001 | Nagaoka et al. ............. 375/240 |
| 2002/0126698 A1 | 9/2002 | Deshpande |
| 2006/0050805 A1 * | 3/2006 | Chen et al. .................. 375/295 |

FOREIGN PATENT DOCUMENTS

| | | |
|---|---|---|
| EP | 0 589 709 A2 | 3/1994 |
| EP | 0 624 033 A2 | 11/1994 |
| JP | 8-251178 | 9/1996 |
| JP | 8-265160 | 10/1996 |
| JP | 9-275426 | 10/1997 |

(Continued)

OTHER PUBLICATIONS

Seamus O'Leary, "Hierarchical Transmission and COFDM Systems", IEEE Transactions on Broadcasting, XP011006067A, vol. 43, No. 2, Jun. 1997, pp. 166-174.
U. Reimers, "DVB-T: The COFDM-Based System for Terrestrial Television", International Broadcasting Convention, XP006510005A, Sep. 12-16, 1996, pp. 120-126.

(Continued)

*Primary Examiner*—Mohammad H Ghayour
*Assistant Examiner*—Vineeta S Panwalkar
(74) *Attorney, Agent, or Firm*—Oblon, Spivak, McClelland, Maier & Neustadt, L.L.P.

(57) ABSTRACT

A modulation device comprises a modulation unit (2) that modulates data in a hierarchical manner using multiple types of modulation techniques, and a transmission unit (3) that transmits the hierarchically modulated data. A demodulation device comprises a receiving unit (4) that receives the hierarchical modulation data having been subjected to hierarchical modulation using multiple types of modulation techniques, and a demodulation unit (6) that demodulates the hierarchical modulation data using a demodulation technique corresponding to a specific hierarchy of the hierarchical modulation data.

6 Claims, 10 Drawing Sheets

FOREIGN PATENT DOCUMENTS

| JP | 2000-31944 | | 1/2000 |
|---|---|---|---|
| JP | 2002-77280 | | 3/2002 |
| WO | WO 01/91332 A1 | * | 11/2001 |
| WO | WO 02/067491 A1 | * | 8/2002 |

OTHER PUBLICATIONS

R. Schäfer, "Terrestrial Transmission of DTVB Signals—The European Specification", International Broadcasting Convention, XP006528910A, Sep. 14-18, 1995, pp. 79-84.

Yiyan Wu, et al., "Comparison of Terrestrial DTV Transmission Systems: The ATSC 8-VSB, the DVB-T COFDM, and the ISDB-T BST-OFDM", IEEE Transactions on Broadcasting, XP-11006128, vol. 46, No. 2, Jun. 2000, pp. 101-113.

Chris Nokes, et al., "Potential Benefits of Hierarchical Modes of the DVB-T Specification", XP-6500685, IEE, Mar. 16, 1999, pp. 10/1-10/4.

* cited by examiner

FIG.7

| CONSTELLATION POINT | MODULATION SIGNAL |
|---|---|
| 0000 | 0.3162+0.3162i |
| 0001 | 0.3162+0.9487i |
| 0011 | 0.9487+0.9487i |
| 0010 | 0.9487+0.3162i |
| 0110 | 0.9487−0.3162i |
| 0100 | 0.3162−0.3162i |
| 0101 | 0.3162−0.9487 |
| 0111 | 0.9487−0.9487i |
| 1111 | −0.9487−0.9487i |
| 1110 | −0.9487−0.3162i |
| 1100 | −0.3162−0.3162i |
| 1101 | −0.3162−0.9487i |
| 1001 | −0.3162+0.9487i |
| 1000 | −0.3162+0.3162i |
| 1010 | −0.9487+0.3162i |
| 1011 | −0.9487+0.9487i |

FIG.8

| SAMPLED DATA | CONSTELLATION POINT | MODULATION SIGNAL |
|---|---|---|
| B1 | 1111 | −0.9487−0.9487i |
| B2 | 1110 | −0.9487−0.3162i |
| B3 | 1110 | −0.9487−0.3162i |
| B4 | 1111 | −0.9487−0.9487i |
| B5 | 1101 | −0.3162−0.9487i |
| B6 | 1100 | −0.3162−0.3162i |
| B7 | 1001 | −0.3162+0.9487i |
| B8 | 1010 | −0.9487+0.3162i |
| B9 | 0010 | 0.9487+0.3162i |
| B10 | 0011 | 0.9487+0.9487i |
| B11 | 0100 | 0.3162−0.3162i |
| B12 | 0111 | 0.9487−0.9487i |
| B13 | 0101 | 0.3162−0.9487 |
| B14 | 0101 | 0.3162−0.9487 |
| B15 | 0101 | 0.3162−0.9487 |
| B16 | 0111 | 0.9487−0.9487i |

FIG.10

| SAMPLED DATA | QPSK DEMODULATION RESULT |
|---|---|
| B1 | 11 |
| B2 | 11 |
| B3 | 11 |
| B4 | 11 |
| B5 | 11 |
| B6 | 11 |
| B7 | 10 |
| B8 | 10 |
| B9 | 00 |
| B10 | 00 |
| B11 | 01 |
| B12 | 01 |
| B13 | 01 |
| B14 | 01 |
| B15 | 01 |
| B16 | 01 |

MODULATION AND DEMODULATION BASED ON HIERARCHICAL MODULATION

BACKGROUND OF THE INVENTION

The present invention generally relates to modulation and demodulation in digital data transmission, and more particularly to a modulation and demodulation technique capable of dealing with multiple types of modulation based on hierarchical modulation.

In recent radio communications, digital modulation techniques are employed in, for instance, cellular phone networks, BS television broadcast, and other digital communication networks. Known modulation techniques used in digital mobile communications include quadrature phase shift keying (QPSK) and quadrature amplitude modulation (QAM).

Quadrature phase shift keying (QPSK) is a modulation technique that uses two carriers out of phase by 90 degrees (that is, quarternary signal states), allowing 2 bits/symbol transmission. FIG. 1 is a QPSK signal constellation, in which the in-phase component and the guadrature component of the QPSK modulation signal are expressed in the phase plane defined by the I-axis (representing the real number) and the Q-axis (representing the imaginary number). The signal constellation is also called "signal diagram". In QPSK modulation, modulation signals with four different phases are arranged at the vertexes of a square. In other words, the transmission signal is represented by one of the four phases.

Another type of QPSK modulation is pi/4-shift QPSK, which is derived from the above-described QPSK and used in personal digital cellular (PDC) phones based on the second generation mobile communications standard. With pi/4-shift QPSK, the phase of the carrier rotates by pi/4 per symbol, providing quarternary signal states.

In W-CDMA in FDD mode, which is one of the radio transmission protocols used in the third generation cellular systems based on the International Mobile Telecommunications-2000 (IMT-2000) standard, BPSK (binary phase shift keying) is used for uplink data modulation, while QPSK is used for downlink data modulation. In TDD mode, QPSK is employed for data modulation on both uplink and downlink.

Another known modulation technique is 16-QAM (quadrature amplitude modulation), which allows 4 bits/symbol data transmission using a combination of phase and amplitude of the carrier representing one of sixteen (16) four-bit patterns. FIG. 2 is an example of a 16-QAM signal constellation. With 16-QAM, four bits (16 patterns) of an input sequence are divided into four 2-bit patterns. The two carriers out of phase by 90 degrees are amplitude-modulated in the respective four signal states, and synthesized. The constellation plotted after the amplitude modulation is shown in FIG. 2. The divisions on the I-axis and the Q-axis are −0.9487, −0.3162, 0.3162, and 0.9487. Comparing the 16-QAM with the above-described QPSK under the same transmission rate, the occupied band-width of 16-QAM is narrower than that of QPSK. This means that 16-QAM is more effective to realize high-speed digital data transmission. However, 16-QAM is easily influenced by fading, which is the phenomenon of sharp fluctuation in intensity level of a radio wave due to environmental change including time and the distance between the transmitter and the receiver. The 16-QAM is mainly used for digital MCA (telecommunications business).

Since the above-described two modulation techniques, QPSK and 16-QAM, are used in digital mobile telecommunications, hardware capable of dealing with these two modulation techniques is desirable. Such hardware is advantageous for both users and manufacturers, reducing the cost of components and the space for accommodating the hardware, while improving operability. From this standpoint, JPA 9-27426 proposes a demodulation technique for demodulating both QAM modulation signals and QPSK modulation signals in one system.

However, in spite of the existence of multiple modulation techniques used in digital telecommunications, the transmission ability and the receiving ability are not always consistent with each other. If a receiver is capable of dealing with only QPSK modulation signals, 16-QAM modulation signals transmitted from a transmitter cannot be demodulated. To overcome this problem, a 16-QAM demodulator has to be furnished in the receiver, in addition to the QPSK demodulator, or alternatively, a system proposed in JPA 9-275426 is required. The former method causes the circuit scale and the cost to increase because an extra demodulator has to be added to the receiver. The latter method provides two independent signal paths, one functioning as a QAM demodulator when receiving a QAM modulation signal, and the other functioning as a QPSK demodulator when receiving a QPSK modulation signal. One of these two demodulation types is selected depending on the modulation type of the received signal. Accordingly, it is essential to furnish the functions of a QAM demodulator and a QPSK demodulator in the circuit structure.

SUMMARY OF THE INVENTION

The present invention is conceived to overcome the above-described problems, and it is an object of the invention to provide a modulation/demodulation technique that allows received data to be demodulated according to the demodulation ability of the receiver even if the demodulation ability on the receiving side is not totally consistent with the modulation functions of the transmission side apparatus.

To achieve the object, in one aspect of the invention, a modulation device is furnished with a hierarchical modulation function. To be more precise, the modulation device comprises a modulation unit that modulates data in a hierarchical manner using multiple types of modulation techniques, and a transmission unit that transmits the hierarchically modulated data.

The modulation device further comprises a sampling pattern generating unit that generates a sampling pattern for each of the modulation techniques. The sampling pattern defines a sampling space for quantizing said data in accordance with each of said modulation techniques. In this case, the modulation unit modulates said data in the hierarchical manner using a digital signal sampled based on the sampling pattern.

The sampling pattern defines the sampling space of a carrier used in, for example, multi-phase phase shift keying or multi-value quadrature amplitude modulation.

Preferably, the transmission unit transmits the sampling pattern together with the hierarchically modulated data.

In another aspect of the invention, a demodulation device that receives and demodulates hierarchical modulation data is provided. The demodulation device comprises a receiving unit that receives hierarchical modulation data having been subjected to hierarchical modulation using multiple types of modulation techniques, and a demodulation unit that demodulates the hierarchical modulation-data using a demodulation technique corresponding to a specific hierarchy of the hierarchical modulation data.

Preferably, the demodulation unit is furnished with multiple types of demodulation techniques, and in this case, the demodulation device further comprises a demodulation type selection unit that selects one of the demodulation techniques to be used for demodulation of the hierarchical modulation data. Accordingly, the hierarchical modulation data are demodulated using the selected one of the demodulation techniques.

The demodulation type selection unit selects said one of the demodulation techniques in accordance with, for example, the traffic of a service area, the propagation environment, or a service request.

Preferably, the receiving unit receives a sampling pattern used for the hierarchical modulation, together with the hierarchical modulation data. In this case, the demodulation unit demodulates the hierarchical modulation data using the sampling pattern.

With the above-described arrangements, transmission data are modulated in a hierarchical manner using multiple types of modulation techniques. The demodulating device on the receiving side does not have to be furnished with all the demodulation functions corresponding to the modulation techniques on the transmission side, but may have a single demodulation function corresponding to a specific hierarchy of the hierarchical modulation data. Consequently, the received data are appropriately demodulated even if the modulation ability on the transmission side and the demodulation ability on the receiving side are not totally consistent with each other. When the receiving side demodulating device is furnished with two or more types of demodulation functions, the optimum demodulation type is selected, taking into account the propagation environment and other factors. Consequently, telecommunications can be maintained without undesirable disconnection even if the propagation environment abruptly changes.

BRIEF DESCRIPTION OF THE DRAWINGS

FIG. 7 is a table of a set of 16-QAM modulation signals;

FIG. 8 is a table of sampled transmission data modulated by 16-QAM;

FIG. 10 is a table of the demodulation results of 16-QAM modulation signals using the QPSK demodulation technique.

DETAILED DESCRIPTION OF THE INVENTION

Figure 3:
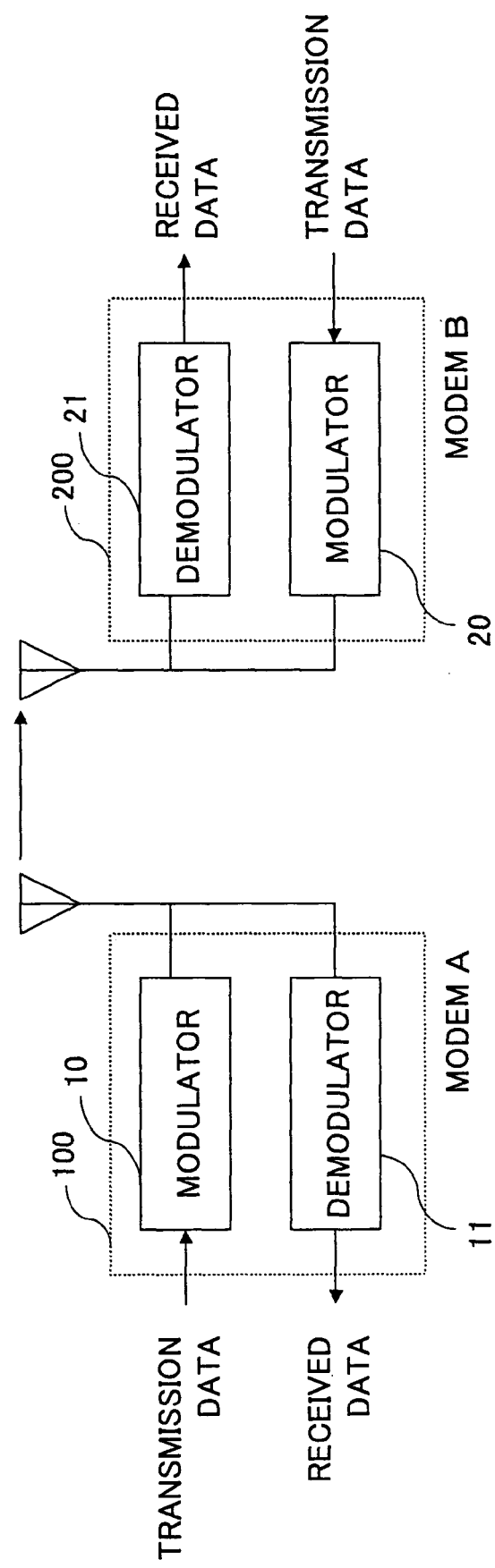
FIG. 3 illustrates the structure of the modulation and demodulation device according to an embodiment of the invention.

The present invention will now be described in detail in conjunction with the attached drawings. FIG. 3 illustrates a modulation and demodulation device (referred to as a MODEM), which comprises a modulator and a demodulator, according to an embodiment of the invention.

Modulation and demodulation device 100 (Modem A) and modulation and demodulation device 200 (Modem B) are located at physically separate positions, and carry out data transmission via wireless telecommunications. The modulation and demodulation devices 100 and 200 (Modem A and Modem B) have the same structure, and they include modulators 10, 20, and demodulators 11, 21, respectively. Each of the modulators 10 and 20 modulates transmission data in a hierarchical manner. Each of the demodulators 11 and 21 demodulates a received signal according to its receiving ability. Since the structures of the modulation and demodulation devices 100 and 200 are the same, the detailed structure thereof will be explained referring to one of these two devices, specifically, Modem A.

Figure 4:
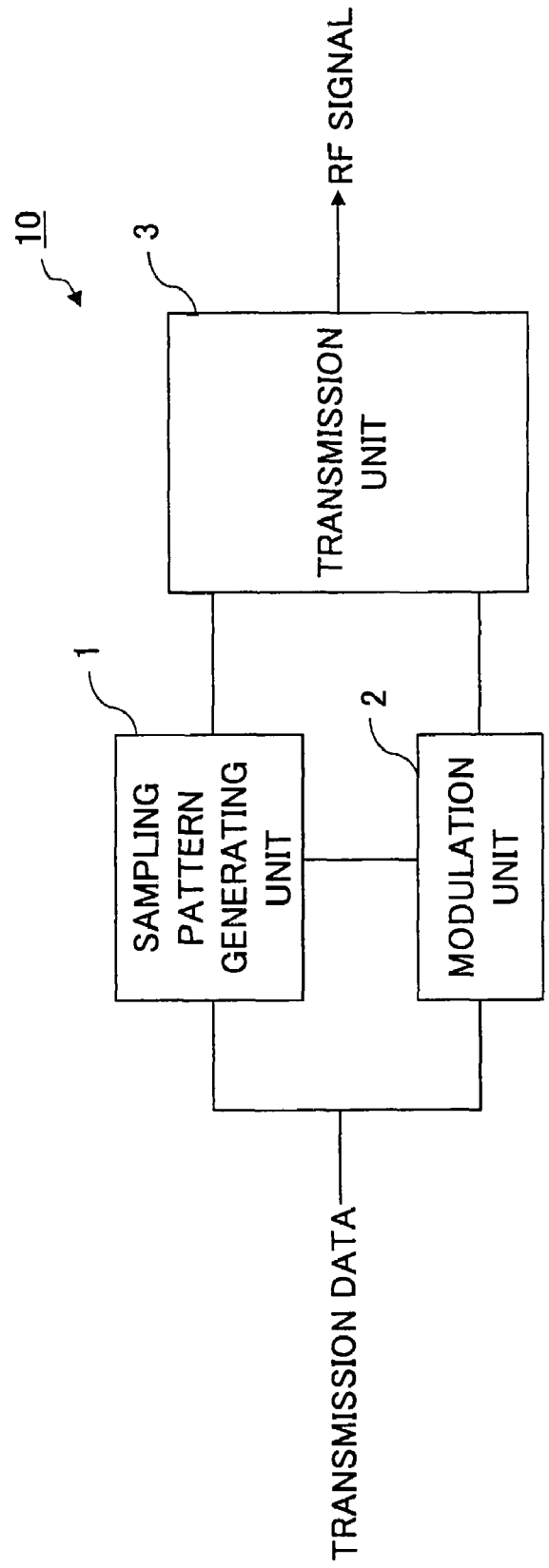
FIG. 4 is a block diagram of the modulator included in the modulation and demodulation device shown in FIG. 1.

FIG. 4 illustrates the modulator 10 of the modulation and demodulation device 100 (Modem A) shown in FIG. 3.

The modulator 10 comprises a sampling pattern generating unit 1, a modulation unit 2, and a transmission unit 3. The sampling pattern generating unit 1 generates sampling patterns according to modulation types, and supplies the sampling patterns to the modulation unit 2. The sampling pattern represents information about the sampling period for acquiring discrete data along the temporal axis and information about sampling space (or interval) for acquiring discrete data (i.e., quantization) in the amplitude direction. The sampling pattern generating unit 1 is capable of generating a sampling pattern according to a modulation type. The modulation unit 2 converts analog transmission data into digital data based on the sampling pattern supplied from the sampling pattern generating unit 1, and modulates the sampled digital data in a hierarchical manner. The hierarchical modulation will be explained later. The transmission unit 3 converts the modulation signal of the transmission data having been subjected to the hierarchical modulation into a radio wave, and outputs the radio frequency transmission signal.

Figure 5:
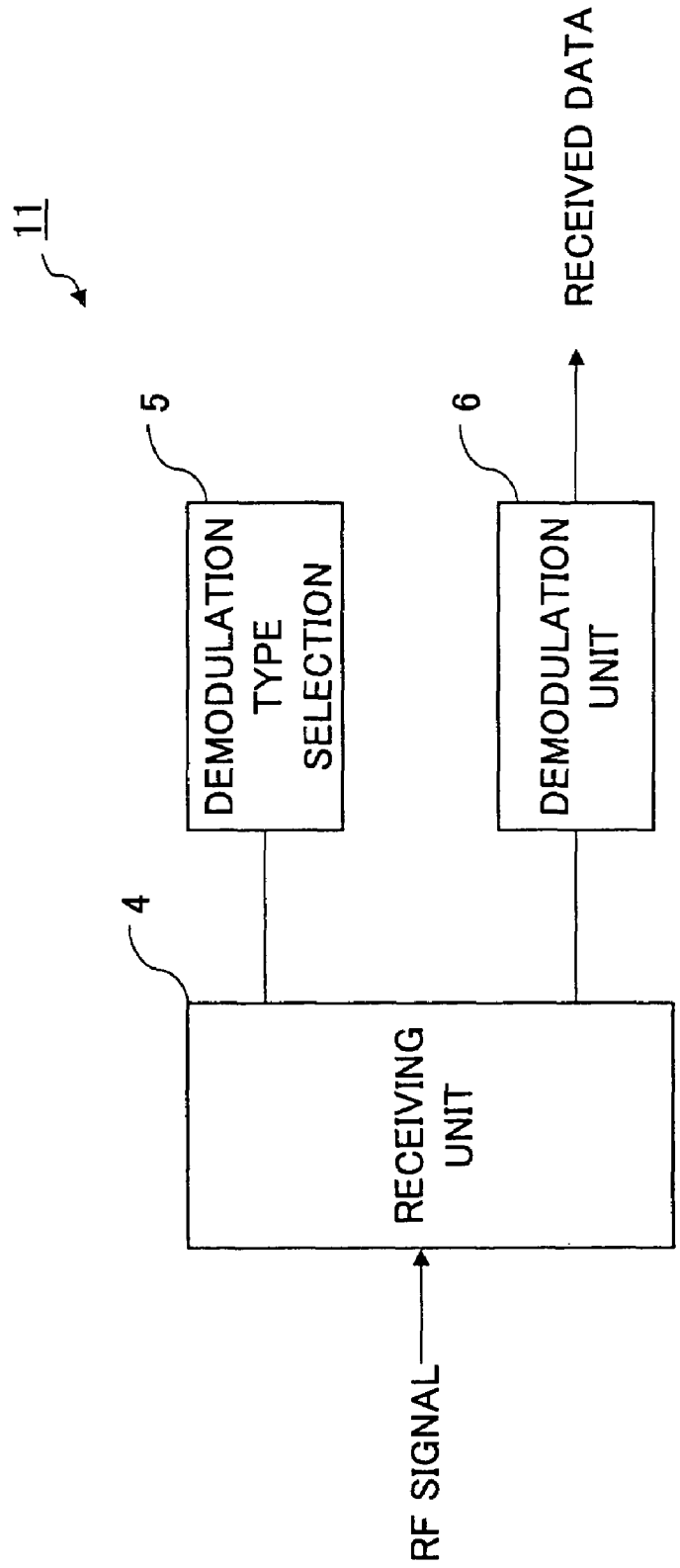
FIG. 5 is a block diagram of the demodulator included in the modulation and demodulation device shown in FIG. 1.

FIG. 5 is a block diagram of the demodulator 11 of the modulation and demodulation device 100 (Modem A).

The demodulator 11 comprises a receiving unit 4, a demodulation type selection unit 5, and a demodulation unit 6. The receiving unit 4 carries out RF processing, such as frequency conversion, on the signal received via a transmission medium (in this example, a wireless network), and supplies the processed signal to the demodulation unit 6. The demodulation type selection unit 5 selects a demodulation type from the demodulation functions (or available demodulation types) of the demodulation unit 6, and designates the demodulation type for the demodulation unit 6. The demodulation unit 6 demodulates the received signal using the selected demodulation type to acquire the data.

In this manner, data are transmitted between the modulation and demodulation device 100 (Modem A) and the modulation and demodulation device 200 (Modem B). Details of hierarchical modulation carried out on the transmission side are described below, assuming that signals are transmitted from the modulation and demodulation device 100 (Modem A) to the modulation and demodulation device 200 (Modem B).

(Operations of Modulator 10 of Modem A on Transmission Side)

The modulator 10 of the transmission-side Modem A carries out hierarchical modulation of transmission data for multiple modulation types. In this example, the multiple modulation types include 16-QAM, which is an example of multi-value QAM, and QPSK, which is an example of multi-phase PSK. Since multiple modulation techniques, namely, 16-QAM and QPSK, are used, the sampling pattern generating unit 1 generates sampling patterns for 16-QAM and QPSK. The sampling pattern for 16-QAM causes the transmission data to be sampled at one of sixteen possible states separated by a prescribed sampling space (quantization in the amplitude direction) every sampling period (Bt). The sampling pattern for QPSK causes the transmission data to be sampled at one of four possible states every sampling period (Bt).

Figure 6:
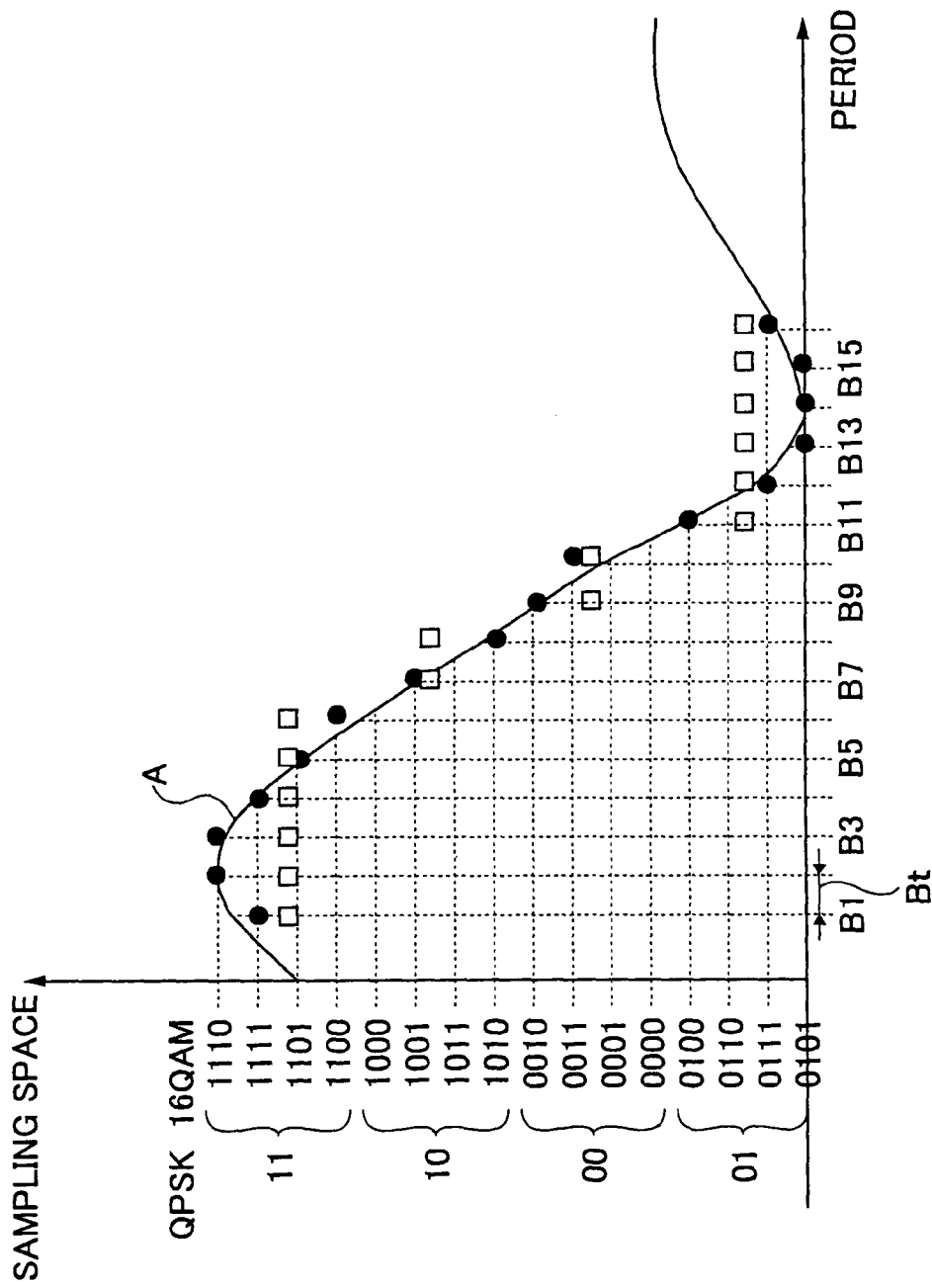
FIG. 6 is a graph showing an example of hierarchical modulation carried out by the modulator shown in FIG. 4.

FIG. 6 illustrates an example of hierarchical modulation carried out by the modulation unit 2, which is obtained by sampling the transmission data using a 16-QAM sampling pattern (sampling pattern 1) and a QPSK sampling pattern (sampling pattern 2), and by modulating the sampled data. In FIG. 6, the curve A represents analog information (for example, voice or sound) as transmission data. If digital data are transmitted based on QAM modulation in which continuous analog data are sampled at a sampling period along the horizontal axis (or time axis) and quantized at a sampling interval along the vertical axis, the restoration accuracy of the original data is improved as the sampling interval along the vertical axis becomes shorter. In other words, the smaller the sampling space in the amplitude directions, the more completely the continuous temporal (analogue) signal can be restored from the sampling values.

Figure 1:
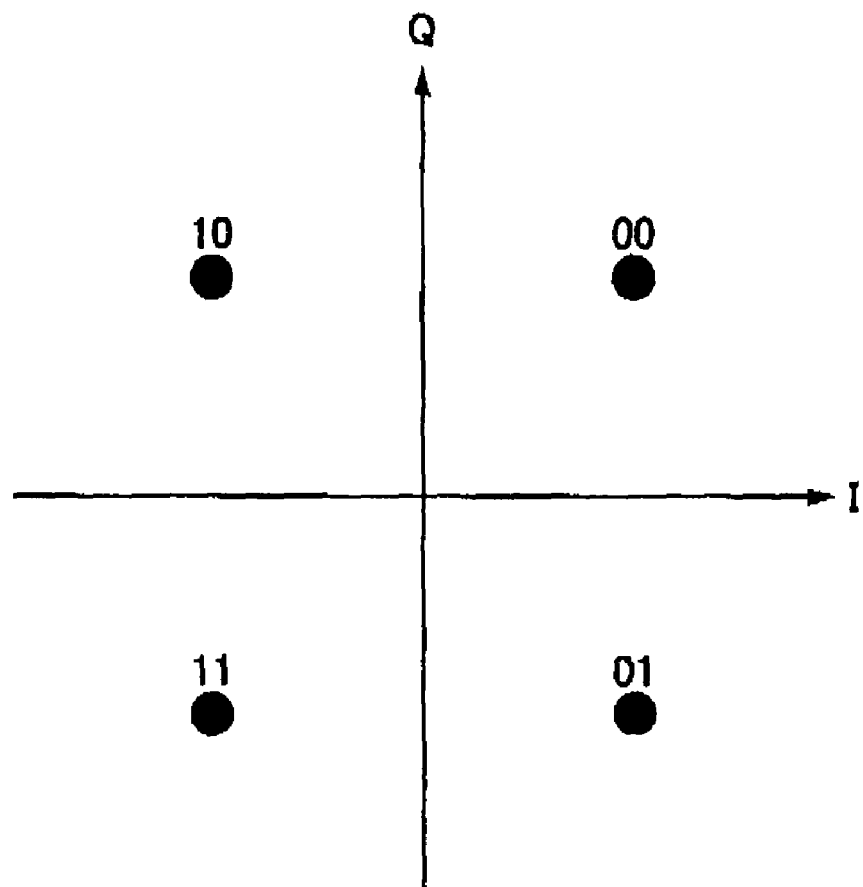
FIG. 1 is an example of a QPSK signal constellation.
Figure 2:
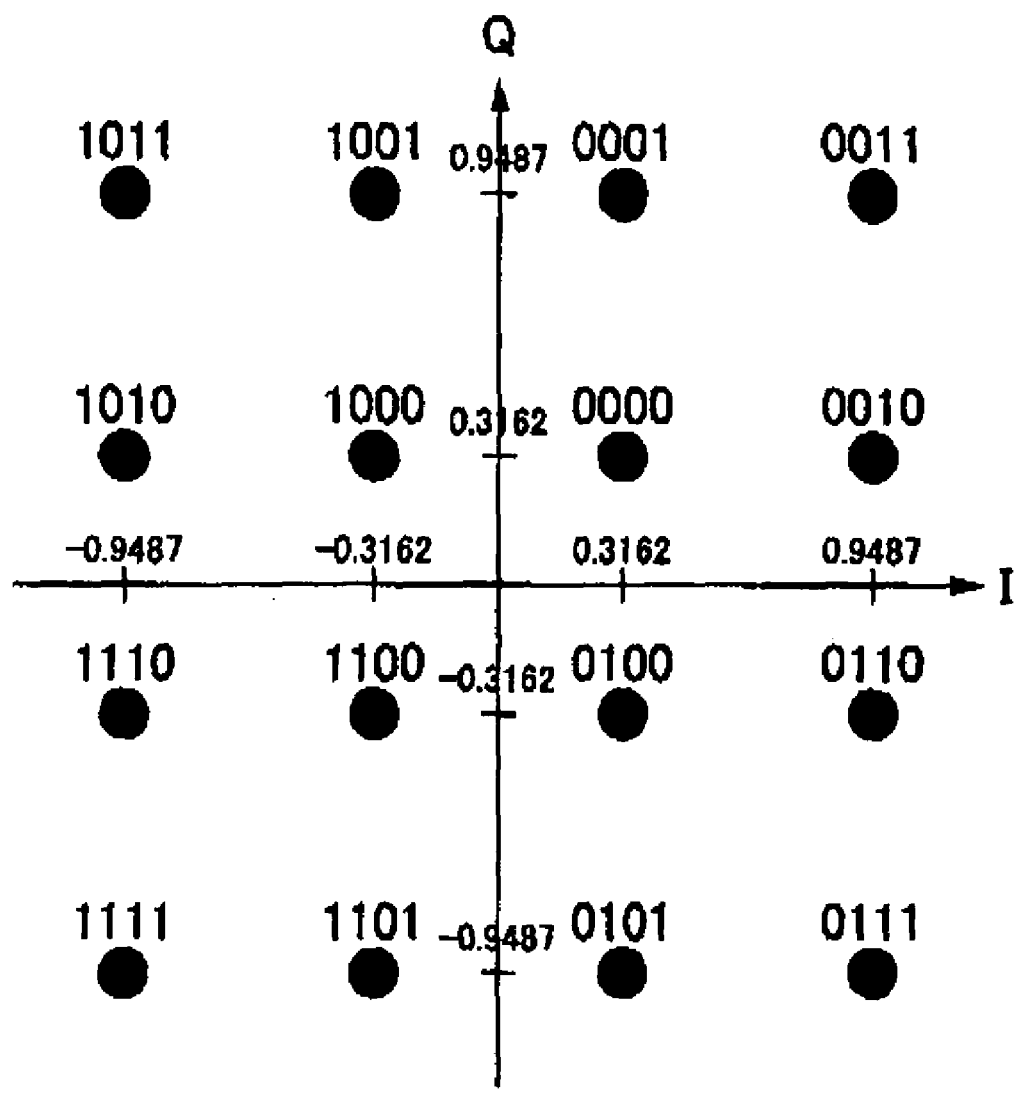
FIG. 2 is an example of a 16-QAM signal constellation.

In FIG. 6, digital transmission data B1-B16 (4-bit data) sampled and quantized based on the 16-QAM sampling pattern (sampling pattern 1) are represented by dark circles. FIG. 7 illustrates the correlation between the constellation points of the 16-QAM signal constellation shown in FIG. 2 and the modulation signals. For the digital data B1-B16, modulation signals shown in FIG. 8 are acquired from the 16-QAM signal constellation of FIG. 2 and the correlation of FIG. 7. The modulation signals correlated to the sampling data B1 through B16 in FIG. 8 are mapped to the constellation points indicated by dark circles in FIG. 9. For example, the modulation signal (−0.9487-0.9487i) of 16-QAM signal (1111) for sampling data B1 is mapped to constellation point (1111) indicated by the dark circle in the third quadrant. Similarly, the modulation signal (−0.9487-0.3162i) of 16-QAM signal (1110) for sampling data B2 is mapped to constellation point (1110) indicated by the dark circle in the third quadrant. The same applies to the 16-QAM signals of B3 and the subsequent sampling data.

Returning to FIG. 6, digital transmission data (2-bit data) B1-B16 sampled and quantized based on the QPSK sampling pattern (sampling pattern 2) are represented by white squares. Since QPSK modulation uses four possible states produced by two carriers out of phase by 90 degrees, the QPSK sampling pattern contains information required to sample the transmission data at four sampling states (00, 10, 11, 01). The modulation phases for these four states are indicated below.

(00): $\pi/4$
(10): $3\pi/4$
(11): $-3\pi/4$
(01): $-\pi/4$

Figure 9:
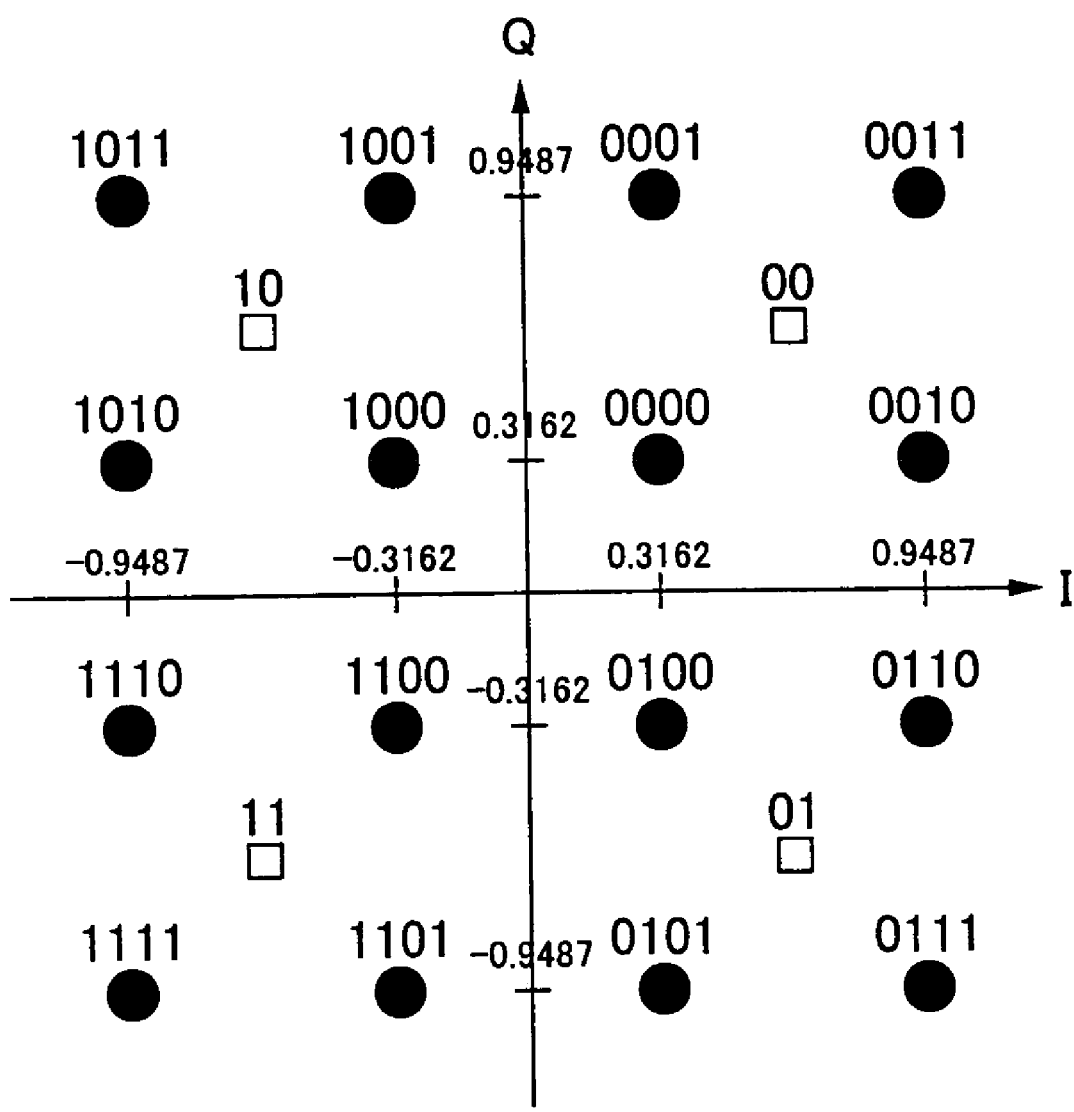
FIG. 9 illustrates correlation between 16-QAM modulation signals and QPSK modulation signals having been subjected to 16-QAM/QPSK hierarchical modulation.

When carrying out hierarchical modulation to these four signal states and mapping into the same coordinate plane as the 16-QAM signal states, the signal constellation shown in FIG. 9 is obtained. FIG. 9 shows the correlation between 16-QAM constellation points and QPSK constellation points during the 16-QAM/QPSK hierarchical modulation performed by the modulator 10. Four states (0000, 0001, 0010, 0011) of 16-QAM indicated by dark circles in the first quadrant correspond to a single state (00) in the QPSK signal space, which is indicated by a white square in the first quadrant. This two-bit data are mapped to the modulation phase of $\pi/4$.

Similarly, four states (1000, 1001, 1010, 1011) indicated by dark circles in the second quadrant correspond to a single state (10) in the QPSK signal space, and this two-bit data are mapped to the modulation phase of $3\pi/4$. Four states (1100, 1101, 1110, 1111) indicated by dark circles in the third quadrant correspond to a single state (11) in the QPSK signal space, and this two-bit data are mapped to the modulation phase of $-3\pi/4$. Finally, four states (0100, 0101, 0110, 0111) indicated by dark circles in the fourth quadrant correspond to a single state (01) in the QPSK signal space, and this two-bit data are mapped to the modulation phase of $-\pi/4$.

The data in the 16-QAM space and the data in the QPSK space are mapped in a hierarchical manner as a layered structure having the same coordinate axes. This operation is referred to as hierarchical modulation of transmission data in this embodiment.

(Operations of Demodulator 21 of Modem B on Receiving Side)

Next, the operations of the demodulator 21 of the modulation and demodulation device 200 (Modem B) for demodulating the 16-QAM/QPSK hierarchical modulation signal transmitted from Modem A will be explained. The demodulator 21 has the same structure as demodulator 11 shown in FIG. 5. When the receiving unit 4 of the demodulator 21 receives the hierarchical modulation signal via the wireless telecommunication network, the demodulation unit 6 demodulates the received signal as it is using the 16-QAM demodulation technique if the demodulator is furnished with a 16-QAM demodulation function. On the other hand, if the demodulation unit 6 has only a QPSK modulation ability, without being furnished with the 16-QAM demodulation function, then the received 16-QAM/QPSK hierarchical modulation signal is demodulated in the following manner based on the QPSK modulation technique.

The demodulation unit 6 determines to which quadrant the 16-QAM layer of the received signal belongs, and finds the corresponding QPSK state in the determined quadrant, prior to carrying out QPSK demodulation. For example, if the signal of the 16-QAM layer represents any one of the four states (0000, 0001, 0010, 0011) of the first quadrant, the modulator 6 takes the first two bits (00 in this example) from the bit sequences of the received 16-QAM signal, and finds a single state (00) of QPSK layer mapped in the first quadrant, as indicated by the white square in FIG. 9. The demodulation unit 6 performs the same operation and successively carried out QPSK demodulation for all of the sampled data B1 through B16. The demodulation result of the 16-QAM modulation signal using the QPSK demodulation technique is shown in FIG. 10. The demodulation unit 6 outputs the QPSK demodulation results to the next processing stage.

Since the transmission data have been modulated in a hierarchical manner using multiple types of modulation techniques, the modulation signal can be demodulated on the receiving side as long as the receiving side demodulator has a demodulation ability corresponding to at least one of the multiple modulation types. This means that even if the modulation/demodulation abilities on the transmission side and the receiving side are not totally consistent with each other, transmission data can be demodulated appropriately according to the demodulation ability of the receiving side modulator, without increasing the circuit scale.

In the above-described example, it is assumed that the demodulation unit 6 of the receiving side demodulator 21 has only demodulation ability for a QPSK signal. However, the present invention is not limited to this example. For example, the modulation unit 6 may have two or more types of demodulation functions, and the optimum demodulation type may be selected from the multiple types of demodulation techniques. In this case, the demodulation type selection unit 5 shown in FIG. 5 is used to select the optimum demodulation type.

The demodulation type selection unit 5 manages the demodulation ability of the demodulation unit 6, and selects the optimum demodulation type for the demodulation unit 6, taking into account the propagation environment, the service request, and other factors. The demodulation unit 6 operates in accordance with the selected demodulation type supplied from the demodulation type selection unit 5. For instance, if the demodulation unit 6 has a 16-QAM demodulation function and a QPSK function, then the demodulation type selection unit 5 selects the most appropriate one at the time of receiving the modulation signal, taking into account the traffic of the service area, the propagation environment, the service request, and other factors.

Especially, under the mobile telecommunication environment in which the modems on the transmission side and the receiving side are connected via a wireless telecommunications medium, with one of the modems moving, the influence of fluctuation due to fading has to be taken into account when selecting the demodulation type. For example, when the influence of the instantaneous fading fluctuation is large, the QPSK demodulation type with a smaller number of modulation signal states is generally selected, and the received data are demodulated so as to satisfy the prescribed quality to the greatest extent possible. On the other hand, under the propagation environment in which the influence of the instantaneous fading fluctuation is small, the 16-QAM demodulation type with a greater number of modulation signal states is selected because the utilization efficiency per unit frequency is superior. In this case, the received data are demodulated aiming at higher transmission quality. In this manner, even if the transmission quality is degraded due to a change in the propagation environment, the optimum demodulation type is selected in accordance with the current conditions. Consequently, the telecommunications can be maintained between the transmission side and the receiving side, without interruption or disconnection. Furthermore, by selecting the demodulation type while taking the traffic of the service area and the service request into account, the service quality is improved.

In the above-described embodiment, the hierarchical modulation signal alone is transmitted from the modulator 10 of the modem A to the demodulator 21 of the receiving side modem B. However, the sampling pattern may also be transmitted to the modem B, together with the hierarchical modulation signal. In this case, the demodulator 21 of the modem B can demodulate the modulation signal using the sampling pattern. Accordingly, the modulation unit 6 of the receiving side modulator 21 does not have to have multiple types of demodulation functions, but has only a modulation function of a specific hierarchy.

Although the present invention has been described using an example of data transmission via a wireless telecommunication network, the present invention can be applied to data transmission via other transmission media, such as a cable. When data transmission is carried out via a wireless telecommunications network, the modulation and demodulation device 100 (Modem A) is installed in a mobile terminal, such as a cellular phone, and the modulation and demodulation device 200 (Modem B) is installed in a base station, for example.

In the above-described embodiment, hierarchical modulation is explained using 16-QAm and QPSK. However, the present invention can be applied to any multi-value QAM exceeding sixteen signal states (for example, 128 or 256 states), and any multi-phase QPSK, such as π/4-shift QPSK or BPSK.

Although the present invention has been described using a modulation and demodulation (MODEM) device, providing a modulation device and a demodulation device separately is also within the scope of the present invention.

Since transmission data are modulated by multiple types of modulation techniques in a hierarchical manner before the data are transmitted, the demodulator of the receiving side device can demodulate the received data as long as it has at least one of the demodulation functions corresponding to a specific hierarchy of the multiple demodulation types. If the demodulator of the receiving side device has two or more types of demodulation functions, the optimum demodulation type can be selected according to the propagation environment or other factors.

The modulation unit 2 of the modulator 10 (and 20) can carry out hierarchical modulation. The transmission unit 3 of the modulator 10 (and 20) has a function of transmitting a modulation signal and a sampling pattern. The sampling pattern generating unit 1 generates a sampling pattern for each of multiple types of modulation techniques. The demodulation unit 6 of the demodulator 11 (and 21) demodulates the hierarchical modulation signal received at the receiving unit 4. The demodulation type selection unit 5 selects the optimum demodulation type corresponding to one of the multiple types of modulation techniques. The demodulation unit 6 can also demodulate the hierarchical modulation signal based on the sampling pattern transmitted from the modulator 10.

In conclusion, since transmission data are modulated with multiple types of modulation techniques in a hierarchical manner, the receiving side demodulator can demodulate the modulation signal as long as it is furnished with at least a single demodulation function corresponding to a specific hierarchy of the modulation signal. Even if the modulation/demodulation abilities on the transmission side and the receiving side are not totally consistent with each other, data can be appropriately demodulated according to the demodulation ability of the receiving side demodulator, without requiring the circuit scale to be increased. When the receiving side demodulator has two or more types of demodulation functions, the optimum demodulation type can be selected in accordance with the circumstances, such as the propagation environment. Consequently, telecommunications can be maintained without disconnection even if the communication quality is degraded due to change in propagation environment.

This patent application is based on and claims the benefit of the earlier filing date of Japanese Patent Application No. 2002-291571 filed Oct. 3, 2002, the entire contents of which are hereby incorporated by reference.

What is claimed is:

1. A modulation device comprising:
   a sampling pattern generating unit configured to generate a sampling pattern for each of multiple types of modulation techniques, the sampling pattern representing information about a sampling period for acquiring discrete data along a temporal axis and information about a sampling space for acquiring discrete data along an amplitude direction;
   a modulation unit configured to modulate data in a hierarchical manner using the multiple types of modulation techniques based on the sampling pattern and to produce hierarchically modulated data that includes signal states for the multiple types of modulation techniques, such that a portion of a bit sequence which represents constellation points in a constellation plane in accordance with a first modulation technique of the modulation techniques is identical with a bit sequence which represents constellation points in a constellation plane in accordance with a second modulation technique of the modulation techniques; and a transmission unit configured to transmit the hierarchically modulated data.

2. The modulation device according to claim 1, wherein the sampling pattern defines the sampling space of a carrier used in one of multi-phase phase shift keying and multi-value quadrature amplitude modulation.

3. The modulation device according to claim 1, wherein the transmission unit is configured to transmit the sampling pattern, together with the hierarchically modulated data.

4. A modulation method, performed on a modulation device, comprising:

generating, at a sampling pattern generating unit, a sampling pattern for each of multiple types of modulation techniques, the sampling pattern representing information about a sampling period for acquiring discrete data along a temporal axis and information about a sampling space for acquiring discrete data along an amplitude direction;

modulating, at a modulation device, data in a hierarchical manner using multiple types of modulation techniques based on the sampling pattern to produce hierarchical modulation data;

producing, at the modulation device, hierarchically modulated data that includes signal states for the multiple types of modulation techniques, such that a portion of a bit sequence which represents constellation points in a constellation plane in accordance with a first modulation technique of the modulation techniques is identical with a bit sequence which represents constellation points in a constellation plane in accordance with a second modulation technique of the modulation techniques; and transmitting, at a transmitting device, the hierarchical modulation data to a demodulator of a counterpart communication device.

5. The modulation method according to claim 4, wherein the sampling pattern defines the sampling space of a carrier used in one of multi-phase phase shift keying and multi-value quadrature amplitude modulation.

6. The modulation method according to claim 4, further comprising:

transmitting the sampling pattern together with the hierarchically modulated data.

* * * * *